April 11, 1961

J. L. STUCKY 2,978,952

EGG CANDLER

Filed Feb. 28, 1956

INVENTOR.
JONAS L. STUCKY
BY
RICHEY, WATTS, EDGERTON, HANEGAN & RUWE
ATTORNEYS

April 11, 1961  J. L. STUCKY  2,978,952
EGG CANDLER
Filed Feb. 28, 1956  6 Sheets-Sheet 2

INVENTOR.
JONAS L. STUCKY
BY RICHEY, WATTS, EDGERTON & MCNENNY
H. E. Whitaker
ATTORNEYS

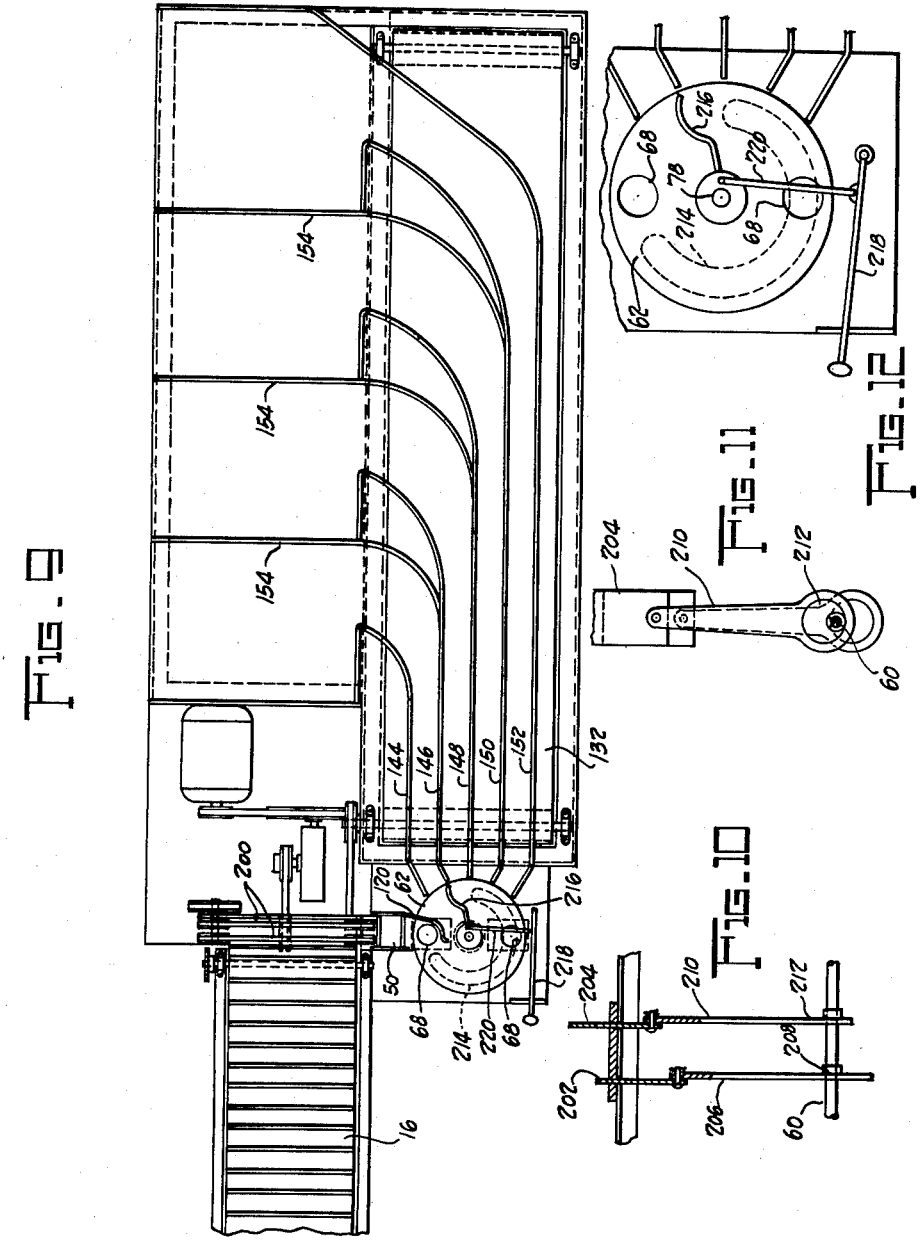

April 11, 1961
J. L. STUCKY
2,978,952
EGG CANDLER
Filed Feb. 28, 1956
6 Sheets-Sheet 4
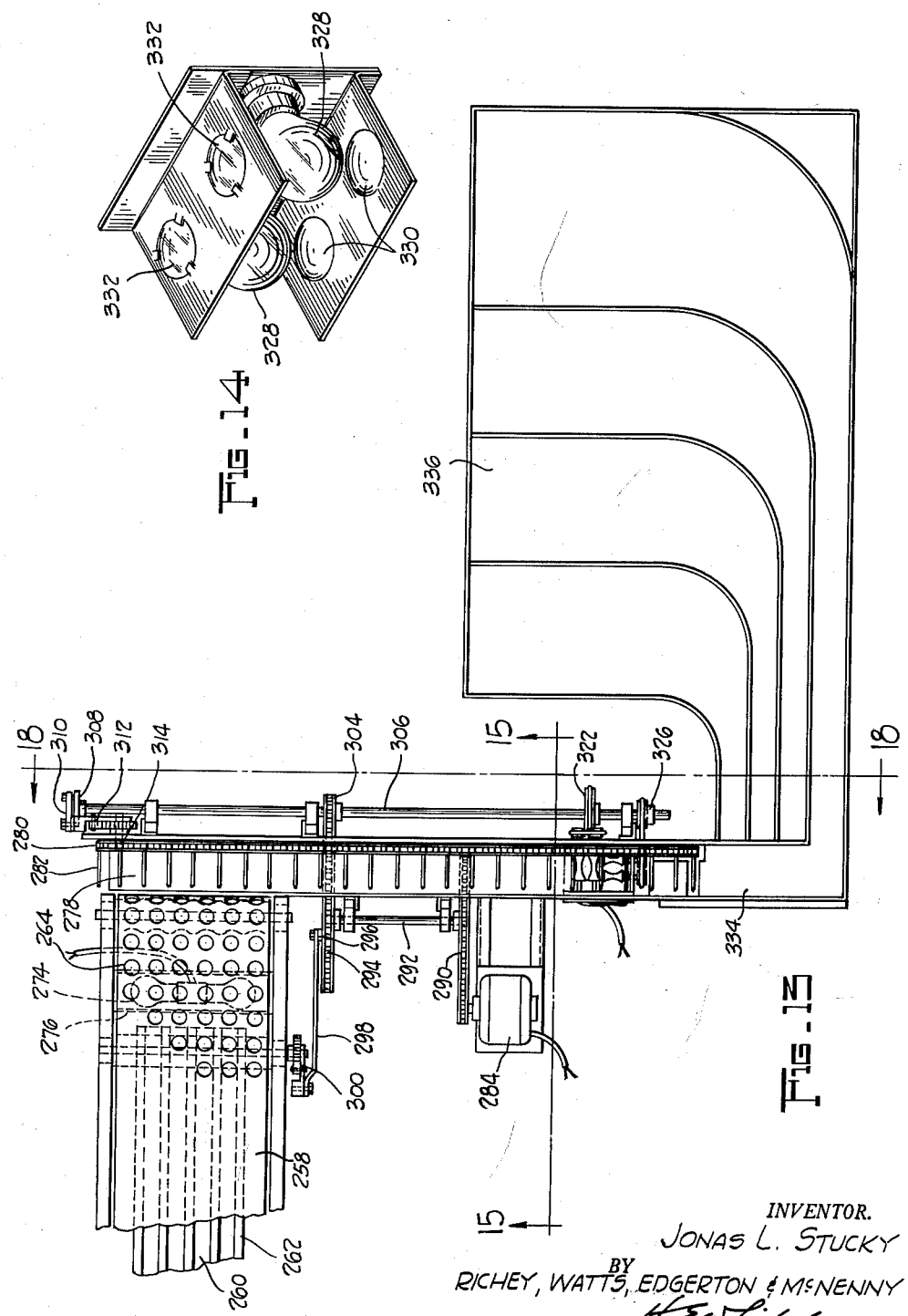
INVENTOR.
JONAS L. STUCKY
BY
RICHEY, WATTS, EDGERTON & McNENNY
ATTORNEYS

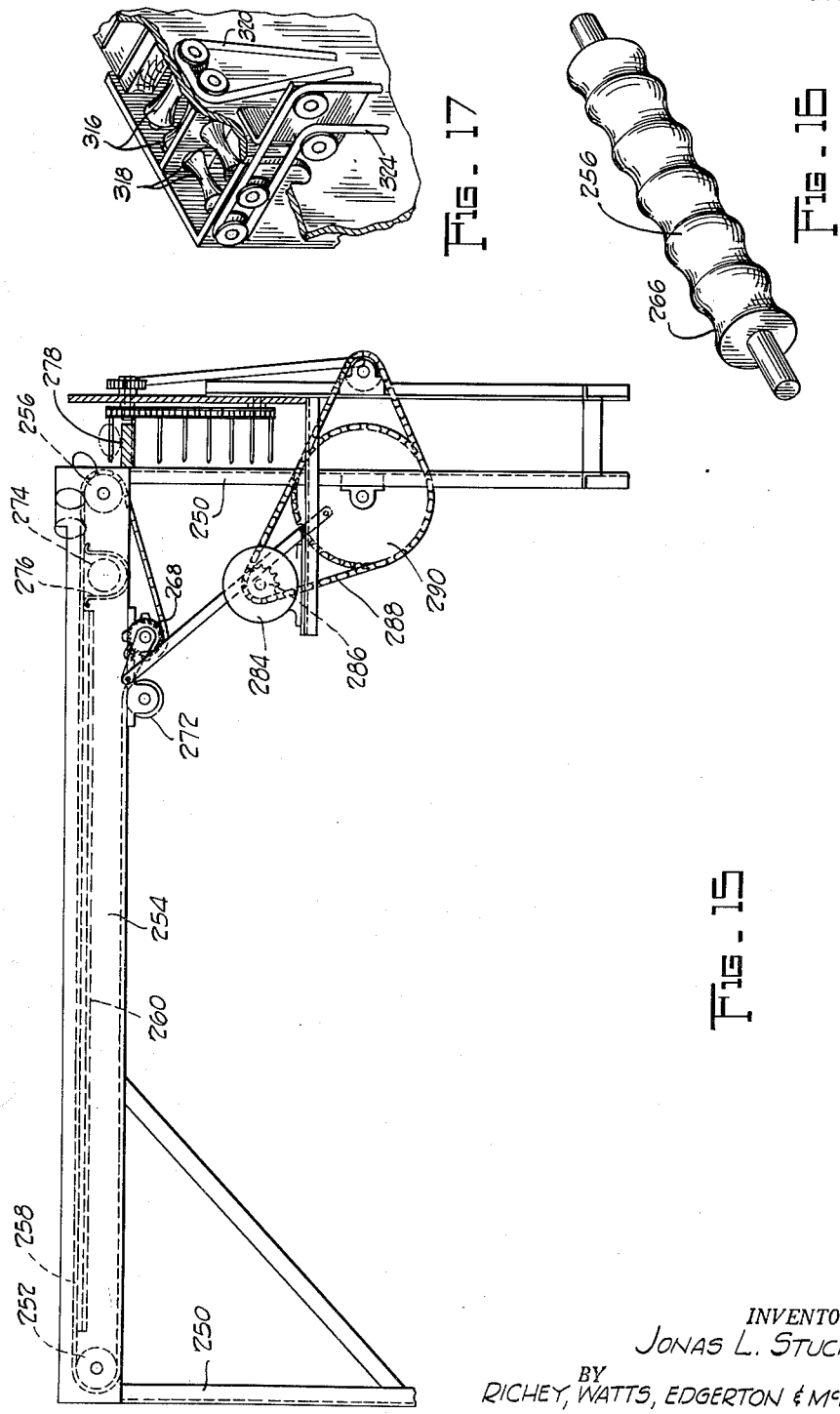

April 11, 1961 J. L. STUCKY 2,978,952
EGG CANDLER
Filed Feb. 28, 1956 6 Sheets-Sheet 6
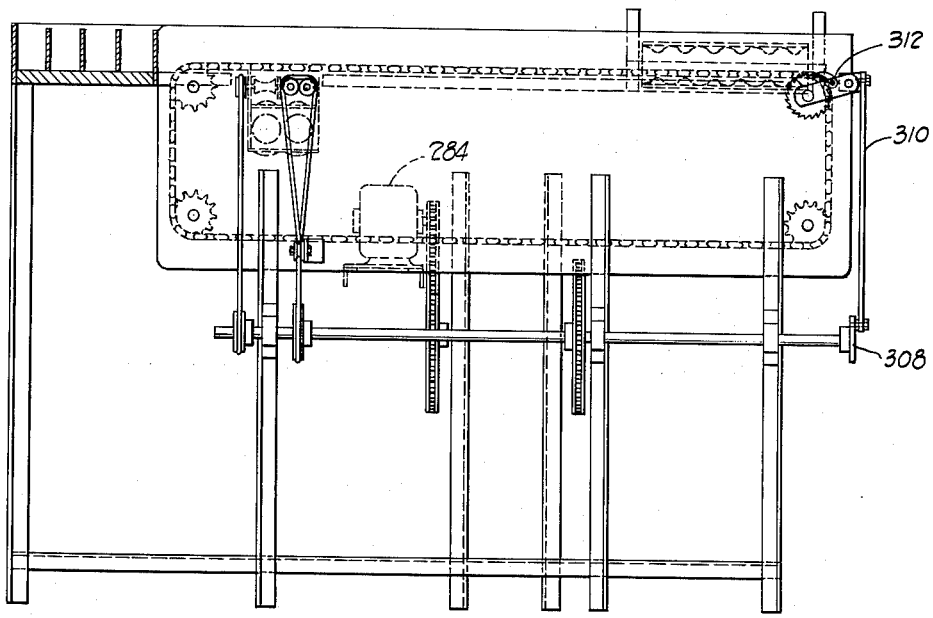
Fig. 18
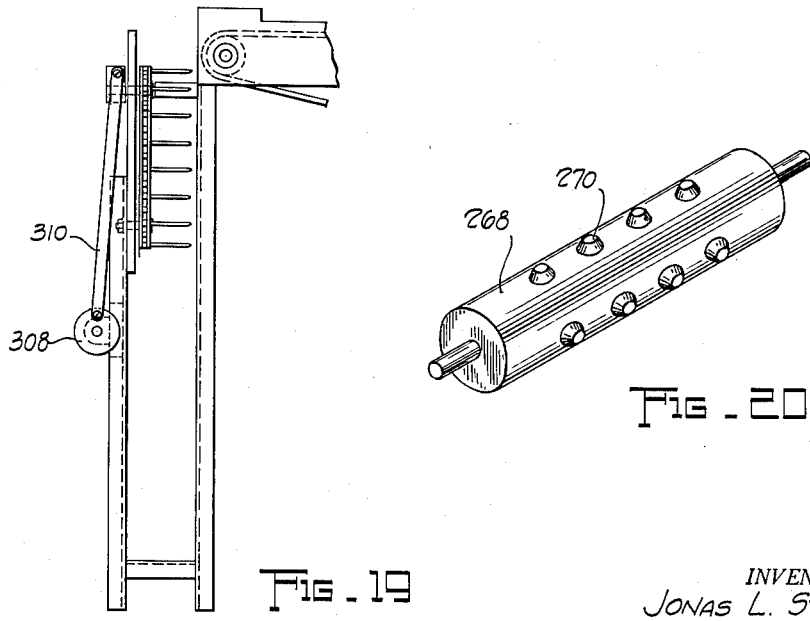
Fig. 19
Fig. 20
INVENTOR.
JONAS L. STUCKY.
BY
RICHEY, WATTS, EDGERTON & McNENNY
ATTORNEYS

United States Patent Office 2,978,952
Patented Apr. 11, 1961

2,978,952

EGG CANDLER

Jonas L. Stucky, 211 N. Ash St., McPherson, Kans.

Filed Feb. 28, 1956, Ser. No. 568,280

7 Claims. (Cl. 88—14.5)

This invention relates to egg handling equipment and more particularly to an egg handler wherein the eggs are continuously carried by machine through the candling operation.

This application is a continuation-in-part of my pending application Serial No. 448,030, filed August 5, 1954.

The invention disclosed and claimed herein contemplates the use of conveying elements for continuously moving eggs for individual illumination in such a manner that an observer may note the condition of each egg and make the necessary classification thereof by controls on the machine. The candling of eggs by hand is notably laborious, tedious and time consuming, which adds materially to the ultimate cost of the eggs to the consumer. The provision of automatic handling equipment eliminates the manual operations and increases the rate at which the eggs may be candled.

In order to provide adequate mechanical handling of the eggs, a conveying system has been devised which will carry the eggs without breakage and introduce the eggs individually into a mechanism which causes the eggs to be illuminated while maintaining darkness in the vicinity of the eggs. The discharge of the eggs from the machine is controlled by the operator viewing the eggs in such a manner that they are confined with other eggs in the same classification for eventual packing and shipping.

To make a complete inspection of an egg to determine quality and condition thereof, it is desirable to rotate and tumble the egg while it is illuminated. It is also desirable to maintain full illumination of the egg throughout the rotating and tumbling cycle in order that the individual making the visual inspection will not be handicapped by varying degrees of illumination. This is accomplished by maintaining the egg in register continuously with the light source during the investigation period. This may be accomplished either by moving the light source in timed relation to a moving aperture in which the egg is carried or by restricting the movement of the egg to rotation and tumbling over a stationary light source.

Accordingly it is an object of this invention to provide apparatus for automatically handling and illuminating eggs for visual analysis.

Another object of this invention is to provide egg candling apparatus which will carry eggs to be candled through a candling cycle and discharge the eggs as classified by the operator of the machine.

A further object of this invention is to provide a traveling conveyor having apertures therein on which the egg rests and which direct the light through the egg while it is in motion.

A still further object of this invention is to provide individual illuminating apparatus for eggs which will rotate the eggs as they pass through the candling cycle.

An important object of this invention is to provide individual lighting apparatus for illuminating eggs as they are rotated and then tumbled at successive stations in the egg candling apparatus.

Another important object of the invention is to provide apparatus which will both rotate and tumble an egg while maintaining the egg in register with a stationary light source.

Another important object of the invention is to provide egg conveying apparatus which will receive a group of eggs are taken from a standard container and transfer the eggs through the machine in individual sequential timed relation.

Another important object of this invention is to provide egg handling apparatus which will convey and deposit one egg at a time into the illuminating apparatus for observation by the operator.

A still further object of this invention is to provide egg conveying apparatus which is timed sequentially for the handling of eggs individually through the egg candling cycle and into the receiving containers.

Other objects and advantages more of less ancillary to the foregoing and the manner in which all the various objects are realized will appear in the following description, which, considered in connection with the accompanying drawings, set forth the preferred embodiment of the invention.

In the drawings:

Fig. 8 is a a detail view of the egg feeder;

Fig. 9 is a top plan view of an egg candling machine with conveyors disposed in alignment;

Fig. 10 is a detail view of a modified egg feeder;

Fig. 11 is a side view of the egg feeder shown in Fig. 10;

Fig. 12 is a detail view of the selector assembly;

Fig. 13 is a plan view of a modified form of my invention;

Fig. 14 is a fragmentary detail view of the lighting assembly;

Fig. 15 is a fragmentary side view showing the conveyor to the candling section;

Fig. 16 is a detail view of the conveyor apron roller;

Fig. 17 is a fragmentary perspective view of the egg rolling assembly;

Fig. 18 is an elevational view from one end;

Fig. 19 is a detail view of the egg conveyor drive; and

Fig. 20 is a detail view of the drive roller for the conveyor apron.

Figure 1:
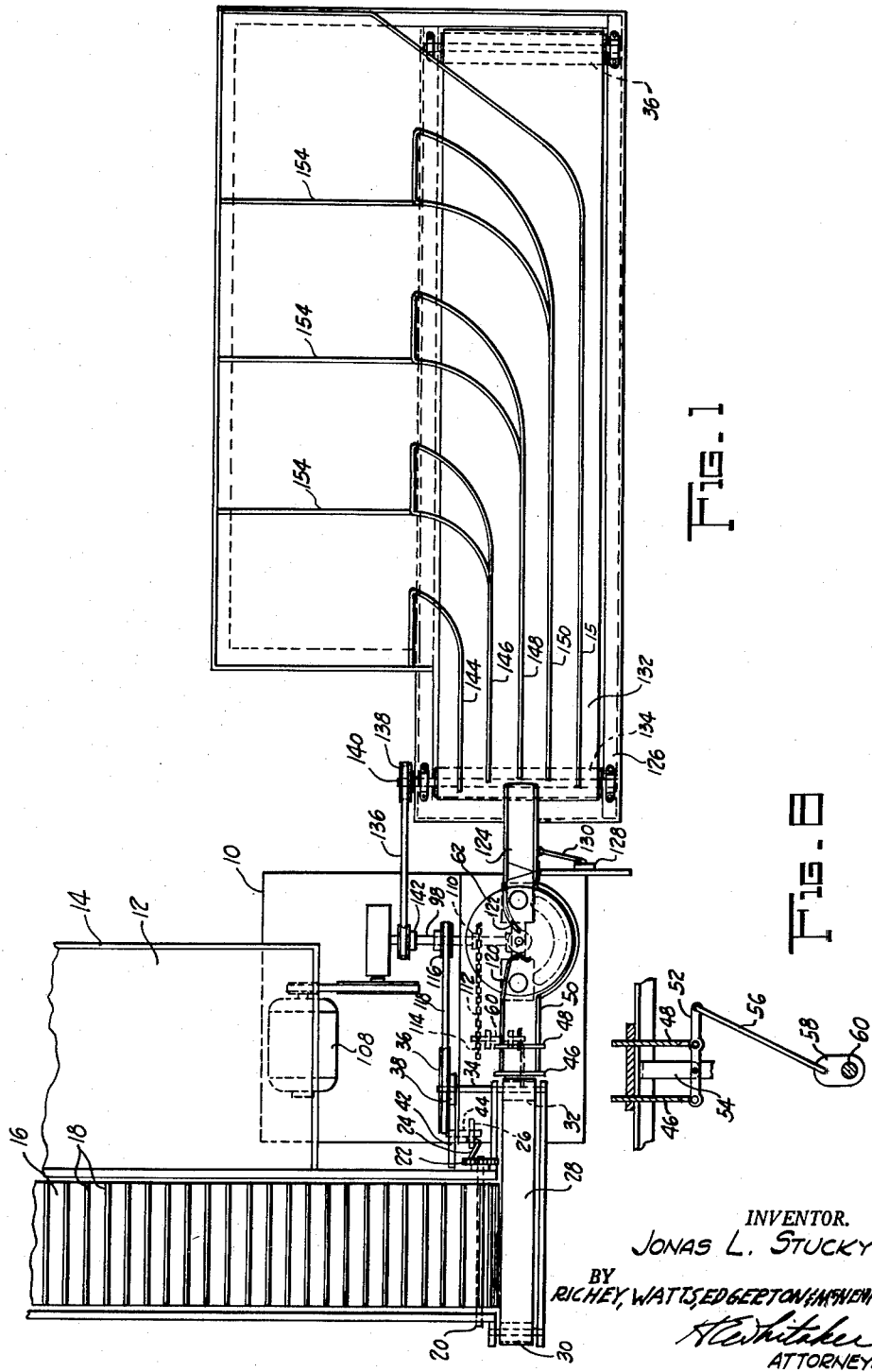
Fig. 1 is a top plan view of an automatic egg candling machine.
Figure 2:
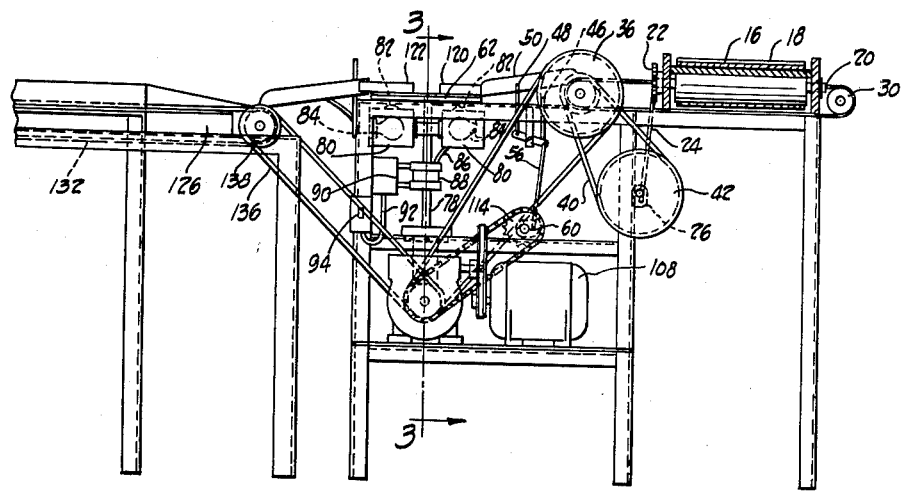
Fig. 2 is a side elevational view of the egg candling machine.
Figure 3:
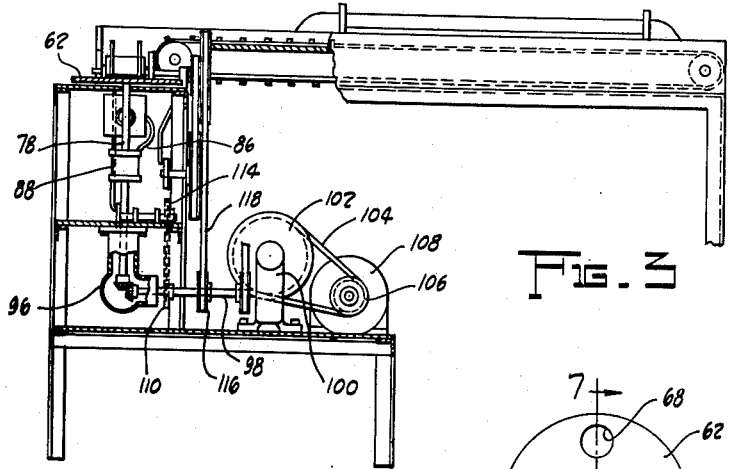
Fig. 3 is a sectional view taken along line 3—3 of Fig. 2 with parts cut away for purposes of clarity.
Figure 4:
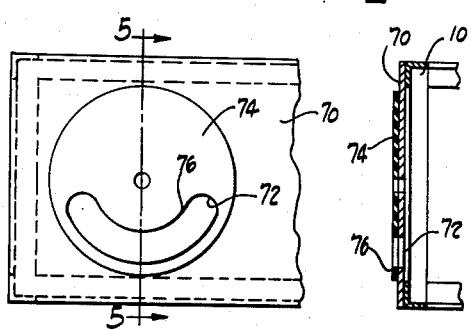
Fig. 4 is a plan view of the stationary table.
Figures 5, 6, 7:
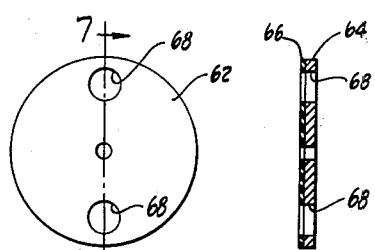
Fig. 5 is a sectional view taken along line 5—5 of Fig. 4.
Fig. 6 is a plan view of the rotating table.
Fig. 7 is a sectional view taken along line 7—7 of Fig. 6.

Referring first to Fig. 1, the egg candling machine is shown therein having a frame 10. A feeder table 12 having guard rails 14 therearound receives the eggs to be candled. The floor of the table 12 is inclined toward a conveyor belt 16 which has rubber strips 18 mounted thereon at specified intervals approximately 1¾" apart. The belt 16 is endless and is driven by the rotation of a shaft 20 which carries the belt 16. A ratchet wheel 22 mounted on the shaft 20 advances the belt 16 by a distance equivalent to the space between the strips 18 after operation of the ratchet rod 24 which has one end eccentrically mounted in the wheel 26. As the belt 16 advances the eggs are discharged onto an endless conveyor belt 28 which travels transversely of the belt 16 and carries the eggs discharged therefrom. The belt 28 is carried by an idle pulley 30 rotatably mounted on the frame 10 to one side of the belt 18. A second pulley 32 at the opposite end of the belt 18 is pivotally mounted in the frame 10 and has a shaft 34 extended therefrom for receiving a drive pulley 36. A drive pulley 38 is mounted on shaft 34 and is connected by a V-belt 40 to a driving pulley 42 which is connected by shaft 44 to wheel 26. Pulleys 38 and 42 are so positioned that the belt 28 advances a distance equivalent to the width of belt 16 during a single operation cycle of the ratchet 22.

The discharge of the eggs from the belt 28 is controlled by a feeder assembly which regulates the flow of the eggs in timed relation with other elements of the machine. A vertical plate 46 is shiftable in the vertical plane for alternately obstructing the discharge of eggs from the belt 28 and for allowing the passage of a single egg. A second plate 48, similar to plate 46, functions in a similar manner to alternately restrain and release the single egg which has been discharged by the plate 46. The eggs pass by gravity through an inclined trough 50 from the conveyor belt 28. The plates 46 and 48 are pivotally joined to a walking beam 52 which is rotatably mounted on a bracket 54 affixed to the frame 10. The connecting rod 56 inter-connects one end of the walking beam 52 with a crank 58 mounted on a shaft 60 which is rotatably carried by the frame 10. Accordingly, a single egg is allowed to pass through the trough 50 for each rotation of the shaft 60 which actuates the egg releasing mechanism.

The eggs from the trough 50 are discharged onto a disk-like rotating table 62 which is formed from a metal disk 64 having a sheet of rubber 66 or similar soft material affixed on the surface thereof. The table 62 is perforated to provide two diametrically opposed openings 68 therethrough.

The frame 10 has a top 70 mounted thereon having a crescent-shaped opening 72 formed therethrough. A rubber disk 74 is applied to the upper surface of the top 70. The rubber disk 74 has a crescent-shaped opening 76 in register with the opening 72 and coinciding therewith in shape and size. Further, the openings 68 in the table 62 are sequentially moved into registration with the opening 76 as the table 62 rotates.

When the egg is lying in the opening 68 it engages and is carried by marginal edges of the opening 76 in the rubber disk 74. As the table 62 rotates, the egg is pushed along by the side of the opening 68 and rolls continuously through the arcuate path of travel on the candling table. The rolling of the egg while it is illuminated allows the operator to make a better estimate of the condition of the egg and in what classification it should eventually be included. The opening in the rotating table 62, therefore, is sized so that the curved surface of a large egg will extend through the opening 68 and engage the edges of the arcuate slot 72.

The rotating table 62 is mounted on a vertical shaft 78 carried by the frame 10. A pair of lamp housings 80 are mounted on the shaft 78 and have lenses 82 therein beneath each of the openings 68 respectively. An electric lamp 84 is provided in each housing 80 respectively for supplying illumination through the lenses or which passes through the openings 72, 76 and 68 to the eggs carried by the table 62. The lamps 84 are supplied with electrical current through wires 86 connected to a slip ring assembly 88 mounted on the shaft 78. A brush assembly 90 engages the slip ring 88 and is connected through wires 92 to an an-off switch 94 which is connected to a source of electrical power.

The shaft 78 is driven by a bevel gear box assembly 96 which is connected by shaft 97 to a gear reducer 100. A pulley 102 on the gear reducer input shaft is connected by a belt 104 to pulley 106 mounted on the shaft of a drive motor 108. The motor 108 provides the power for rotating the table as well as driving the various conveyors and the control mechanisms.

A sprocket 110 is mounted on the shaft 98 and is connected by a roller chain 112 to a sprocket 114 which is mounted on shaft 60. Accordingly, a fixed relationship exists between the actuation of the control plates 46 and 48 and the rotation of the table 62. This mechanism provides a single egg to be discharged on the table and lodged in the opening 68 as the opening 68 passes the end of the trough 50. The pulley 116 mounted on shaft 98 is connected to pulley 36 by the belt 118 and continuously drives the conveyor belt 28 and the belt 16.

As the eggs leave the trough 50, a baffle 120 guides the eggs onto the table 62 in such a manner that they will immediately drop into the opening 68. The baffle 120 is curved to locate the eggs in the area traversed by the opening 68 to facilitate their engagement therewith. A deflector 122 is positioned above the opposite side of the table 62 and is curved to engage the egg and remove it from the rotating table. The discharge trough 124 sloping downwardly away from the table 62 receives the eggs discharged from the table by the deflector 122 and carries them onto a grading table 126. The trough 124 is pivoted for swinging movement and is positioned by actuation of a lever 128 pivotally mounted on the frame 10 and connected to the trough 124 by a link 130.

The grading table is provided with a belt conveyor 132 carried by a driving roller 134 and an idler roller 136 pivotally mounted on the table 126. The roller 134 is driven by a belt 136 which engages a pulley 138 affixed to a shaft 140 on which the roller 134 is mounted. The pulley 142 is mounted on the shaft 98 thus causing translational movement of the belt 132 when the candling table 62 is rotating.

A series of directing baffles 144, 146, 148, 150 and 152 are located above the belt 132 for removing the eggs carried thereon in a predetermined manner. The ends of the baffles are located in such a manner that they are adjacent the discharge end of the trough 124 when it is in its various operating positions. The baffles each cooperate with the adjoining baffle to provide a channel which is preselected by the operator in moving the lever 128. The grading table 126 is provided with sections which have separators 154 therebetween to accumulate the eggs in their respective classifications as determined by the candling operation. Accordingly, if the trough 124 is moved to the space between baffles 144 and 146 an egg coming from the candling table 162 will be discharged therebetween carried along by the belt 132 and deflected to the stationary portion of the grading table 132 in the section as shown in Fig. 1. By repositioning the lever 128 it is possible therefore for the operator to place the eggs as they are candled and classified in any desired stationary receiving section of the table. When the eggs have been classified in this manner all of the eggs from the particular section are packed together which involves merely removing them from the table and placing them in the usual case provided for that purpose.

In the alternate form of my invention shown in Fig. 9 the egg candling apparatus functions in the same manner as that just previously described. However, certain details of construction are somewhat different and are preferred for certain types of installations. In Fig. 9 the conveyor 16 is shown operating in the general direction of conveyor 132 which results in a machine which is more adaptable to location in a long narrow space. The conveyor belt 16 delivers the eggs to the cross-conveyor which is formed from a pair of spaced narrow belts 200. The discharge of the eggs from the belts 200 and the timing of the placing of the egg on the table 52 is accomplished by the plates 202 and 204 mounted for vertical reciprocation in the trough 50.

The plate 202 is actuated by a connecting rod 206 which is driven by an eccentric 208 mounted on the shaft 60. A similar connecting rod 210 is connected with the plate 204 and is driven by an eccentric 212 also mounted on shaft 60. The eccentrics 208 and 212 are affixed to the shaft 60 in such a manner that the throw of each is diametrically opposed to the other. In this manner the plate 202 is in a lowered position while plate 204 is in a raised position, their positions alternating as the shaft 60 rotates.

The rotating table 62 has openings 68 formed therein on opposite sides in the machine shown in Fig. 9. The arcuate slot 214 beneath the table 62 extends half the length of the angular displacement of the table 62, thereby increasing the length of time that the egg is illuminated before discharge from the table 62. In lieu of the swinging trough 124, a deflector 216 is pivotally mounted on the vertical shaft 78 for rotation thereby controlling the point at which the egg is removed from the table 62. A lever 218 is pivotally mounted on the frame 10 connected with the deflector by a link 220. Lateral movement of the lever 218 causes the deflector to be rotationally displaced for selective discharge of the eggs from the table. In the modified form the directing baffles 144, 146, 148, 150 and 152 have their forward ends adjacent to table 62, thus making possible the alignment therewith of the deflector 216. Accordingly, the operator may distribute the eggs in their classification by actuation of the lever 218 and positioning of the deflector 216 at the ends of a preselected baffle.

In operation, a layer of eggs is placed on the table 12 from which they gravitate onto the belt 16. The ribs 18 on the belt 16 assures the delivery of eggs in rows and at a predetermined rate onto the conveyor belt 28. The conveyor belt 28 continuously delivers the eggs against the regulating plate assembly which functions in timed relation to the candling table to allow the placing of an egg in the illuminated opening in the candling table each time the opening passes the supply assembly. An operator observes the condition of the egg as it is rolled along an arcuate path by the rotating table 62 and is being continuously illuminated by the lamps below the openings in the table 62.

After the operator has determined the condition of the egg the control lever 128 is shifted to cause the trough 124 to confront the desired channel and the egg is deflected from the candling table through the trough to the conveyor 132. The egg is directed by the baffles onto the sectionalized receiving table where it is retained with the other eggs of similar condition for packing purposes. It can be seen that the eggs travel from the supply table through the candling operation and to the receiving table by means of conveyors and the only manual operation required is the positioning of the discharge trough 124 to select the section of the receiving table in which the egg is to be retained. A very rapid candling rate is obtainable by the use of this machine since the eggs are not handled by the operator from one container through the candlnig device into another container.

A modified form of my invention is shown in Fig. 13, et seq., and includes a frame 250 which supports for rotation a roller 252 at one end of an elongated portion 254 of the frame. At the opposite end of the portion 254 the roller 252, a second roller 256 is mounted for rotation parallel to roller 252. An endless apron 258 is carried by the rollers 252 and 256 in a substantially horizontal direction. A supporting platform 260 is affixed to the frame and has integral therewith a plurality of spaced ribs 262.

The apron 258 is perforate, a series of openings 264 being formed in the apron in a rectilinear pattern. The openings 264 are positioned on approximately 1¾ inch centers in each direction which conforms to the standard dimensions for the location of eggs in shipping containers. The openings 264 are approximately ¾ inch in diameter and disposed in transverse rows of six openings. The ribs 262 are positioned to engage the apron 258 between the openings thus providing a space beneath the openings into which a portion of the egg may project. It is noted that the roller 256 is formed with a series of six grooves 266 which are in alignment with the row of openings 264 as they pass over the roller 256 in order that the eggs will not be displaced from the apron 258 until they have reached the discharge point.

A drive roller 268 is rotatably mounted on the frame 250 beneath the portion 254 and has formed thereon a plurality of bosses 270 positioned in such a manner that as the roller 268 is rotated the bosses 270 engage the openings 264 to provide a positive drive of the apron 258 as required by the timing cycle. An idler roller 272 is mounted for rotation on the frame 250 in such a position that a substantial portion of the apron 258 is in engagement with the roller 268 shown in detail in Fig. 20. A light source 274 is positioned beneath the apron 258 and is provided with a light-tight housing 276 for illuminating a single row of openings 264 in order that an operator may remove cracked eggs at this point in the path of travel of the eggs through the machine.

The eggs are discharged from the apron 258 onto a stationary elongated horizontal platform 278. The longitudinal axis 278 is disposed perpendicular to the direction of the movement of the apron 258. A roller chain 280 is disposed above and at the side of the platform 278 opposite to the apron 258 and carries a plurality of pins 282 which have the same spacing as the openings in the apron 258. The pins are positioned above and extend across the width of the platform 278 and push the eggs therealong. As the eggs are rolled they tend to roll with the longitudinal axis parallel to the pins 282. The pins 282 are rubber covered to prevent cracking the shell as the eggs are moved. As the eggs are discharged from the apron 258 they occupy the space between adjacent pins and are then handled individually through the machine.

An electric motor 284 provided with a suitable source of power and controls for energizing and de-energizing the same is mounted on the frame 250 and drives a sprocket 286 over which a roller chain 288 passes. A second sprocket 290 is mounted on a shaft 292 which is carried for rotation by the frame 250 and has a sprocket 294 mounted on the end thereof opposite to the sprocket 290. The sprocket 294 has an off-center stud 296 affixed thereto which carries a connecting rod 298 for reciprocating and operating a ratchet mechanism 300 mounted on the roller 268 which drives the apron 258. The ratchet mechanism 300 produces intermittent movement in the apron 258 as the drive mechanism is operated.

A roller chain 302 engages the sprocket 294 and a sprocket 304 mounted on a shaft 306 rotatably mounted on the frame 250. The shaft 306 drives a pitman wheel 308 and pitman 310 which operates a ratchet mechanism 312 fixed to a sprocket and shaft 314 which drives the chain 280 along its path of travel. It can be seen therefore, that a timed relation exists between the movement of the apron 258 and the chain 280 by virtue of the sprocket and chain drive between the shafts 292 and 306 and the ratchets 300 and 312. The sprockets are so sized that the chain 280 moves a distance substantially the width of the apron 258 in the length of time required for the pins moving the row of eggs from the apron 258 to clear the area confronting the discharge end of the apron 258 so that a series of empty spaces between the pins is in register with the openings in the apron 258 at the moment of discharge of a row of eggs from the apron 258. The timing of the machine is arranged to move the chain 280 by intermittent steps at intervals of approximately one second and to move the apron 258 at intervals of approximately six seconds.

The candling operation is performed at the rolling and tumbling station which is in the path of movement of the eggs as accomplished by the translation of the chain 280. The candling station is best illustrated in Fig. 17 wherein the eggs are moving from the right. A pair of dumbbell-shaped resilient rollers 316 are mounted with their axis of rotation parallel to the pins 282 and parallel to the longitudinal axis of the egg as it approaches the candling section. The rollers rotate in the same direction which tends to carry the egg several rotations during the interval that is spent on the rollers. It is noted that the movement of the chain 280 is such that the space between the pins 282 is in register with the space between the rollers 316. When the chain is moved another increment the egg is moved from the rollers 316 to the rollers 318 which have their axis of rotation perpendicular to that of rollers 316. Since the rollers 318 rotate in the same direction the egg lying thereon is tumbled end over end since the axis of rotation of the egg is now perpendicular to the axis of rotation when the egg was on the rollers 316.

A belt drive 320 is in engagement with a pulley 322 mounted on the shaft 306, and the belt drive 324 engages a pulley 326 also mounted on shaft 306. Since shaft 306 rotates continuously it can be seen that the rollers will rotate continuously and that the egg is rotated and tumbled continuously while at rest thereon during the stationary interval between movements of the pins 282.

A light source is provided immediately beneath rollers 316 and 318 and is best illustrated in Fig. 14 wherein a pair of lamps 328 is located within a light-tight box. Reflectors 330 direct the light upwardly to condenser lenses 332 over the lamps 328. Each of the lenses 332 is spaced between the rollers 316 and 318 respectively to produce a concentrated beam of light which strikes the egg as it rests on the rollers 316 and 318 during the rolling and tumbling cycle.

As the eggs are removed from the candling rollers 316 and 318 by further movement of the pins 282 they are discharged onto a sloping platform 334, the end of which connects directly with a section of the classification table 336. It is noted that since a majority of the eggs are of one particular class it is only necessary for the observer at the candling section to remove the few eggs which are of other qualities and place them by hand in the respective classification section on the table 336 which is intended to receive such eggs. When a number of eggs has been accumulated on the table 336 they are then packaged for sale and shipment.

Although the foregoing description is necessarily a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. In an egg candling apparatus having an endless-type conveyor and a candling section, said conveyor including a floor and traveling pin means for moving the eggs across the floor and through the candling section, said candling section comprising adjacent pairs of roller means, each pair being mounted for rotation on fixed parallel axes, one of said pair of roller means having its axes of rotation perpendicular to the axes of rotation of a second pair, and light means for directing a beam of light between each pair of roller means respectively, said conveyor placing the eggs successively on each pair of roller means for tumbling the eggs after they have been rolled on the preceding pair of roller means.

2. In an egg candling apparatus having an endless-type conveyor and a candling section, said conveyor including a floor and traveling pin means for moving the eggs across the floor and through the candling section, said candling section comprising adjacent pairs of roller means, each pair being mounted for rotation on fixed parallel axes, one of said pair of roller means having its axes of rotation perpendicular to the axes of rotation of a second pair, light means for directing a beam of light between each pair of roller means respectively, said conveyor placing the eggs successively on each pair of roller means for tumbling the eggs after they have been rolled on the preceding pair of roller means, and conveyor means adapted to receive the eggs from the candling section for transfer to a classification table.

3. In an egg candling apparatus having an endless-type conveyor and a candling section, said conveyor including a floor and traveling pin means for moving the eggs across the floor and through the candling section, said candling section comprising adjacent pairs of rollers, each pair being mounted for rotation on fixed parallel axes, one of said pair of rollers having its axes of rotation perpendicular to the axes of rotation of a second pair, and light means for directing a beam of light between each pair of rollers respectively, said conveyor placing the eggs successively on each pair of rollers for tumbling the eggs after they have been rolled on the preceding pair of rollers.

4. In an egg candling apparatus having an endless-type conveyor and a candling section, said conveyor including a floor and traveling pin means for moving the eggs across the floor and through the candling section, said candling section comprising adjacent pairs of rollers, each pair being mounted for rotation on fixed parallel axes, one of said pair of rollers having its axes of rotation perpendicular to the axes of rotation of a second pair, and light means for directing a beam of light between each pair of rollers respectively, said conveyor placing the eggs successively on each pair of rollers for tumbling the eggs after they have been rolled on the preceding pair of rollers, said rollers being resilient and having a dumbbell shape.

5. Egg candling apparatus comprising a perforate conveyor apron for receiving a group of eggs as found in a layer in a standard shipping case, said perforations being in rows transverse of said apron and receiving a portion of the eggs placed on the apron, an intermittently-moving endless-type conveyor transverse the end of said first conveyor and including a floor and traveling pin means for moving the eggs across the floor, said pin means being spaced to receive a row of eggs from said first conveyor, a candling section having adjacent pairs of roller means, each pair being mounted for rotation on fixed parallel axes, one of said pair of roller means having its axes of rotation perpendicular to the axes of rotation of a second pair, light means for directing a beam of light between each pair of roller means respectively, said second conveyor placing the eggs successively on each pair of roller means for tumbling the eggs after they have been rolled on the preceding pair of roller means, and a third conveyor means adapted to receive the eggs from the second conveyor means.

6. Egg candling apparatus comprising a perforate conveyor apron for receiving a group of eggs as found in a layer in a standard shipping case, said perforations being in rows transverse of said apron and receiving a portion of the eggs placed on the apron, light means beneath the apron for illuminating a row of said perforations, an intermittently-moving endless-type conveyor transverse the end said first conveyor and including a floor and traveling pin means for moving the eggs across the floor, said pin means being spaced to receive a row of eggs from said first conveyor, a candling section having adjacent pairs of roller means, each pair being mounted for rotation on fixed parallel axes, one of said pair of roller means having its axes of rotation perpendicular to the axes of rotation of a second pair, and light means for directing a beam of light between each pair of roller means respectively, said second conveyor placing the eggs successively on each pair of roller means for tumbling the eggs after they have been rolled on the preceding pair of roller means.

7. Egg candling apparatus comprising a perforate conveyor apron for receiving a group of eggs as found in a layer in a standard shipping case, said perforations being in rows transverse of said apron and receiving a portion of the eggs placed on the apron, light means beneath the apron for illuminating a row of said perforations, an intermittently-moving endless-type conveyor transverse the end of said first conveyor and including a floor and traveling pin means for moving the eggs across the floor, said pin means being spaced to receive a row of eggs from said first conveyor, a candling section having adjacent pairs of roller means, each pair being mounted for rotation on fixed parallel axes, one of said pair of roller means having its axes of rotation perpendicular to the axes of rotation of a second pair, light means for directing a beam of light between each pair of roller means respectively, said second conveyor placing the eggs successively on each pair of roller means for tumbling the eggs after they have been rolled on the preceding pair of roller means, and a third conveyor means adapted to receive the eggs from the second conveyor means.

References Cited in the file of this patent

UNITED STATES PATENTS

| | | |
|---|---|---|
| 843,622 | McTaggart | Feb. 12, 1907 |
| 1,221,730 | Hatfield | Apr. 3, 1917 |
| 1,473,279 | Clairemont | Nov. 6, 1923 |
| 1,902,244 | King | Mar. 21, 1933 |
| 2,044,981 | Guttman | June 23, 1936 |
| 2,070,980 | Wyland | Feb. 16, 1937 |
| 2,135,778 | Wyland | Nov. 8, 1938 |
| 2,175,262 | Haugh | Oct. 10, 1939 |
| 2,717,729 | Page et al. | Sept. 13, 1955 |